United States Patent [19]

Behm et al.

[11] Patent Number: 4,865,206

[45] Date of Patent: Sep. 12, 1989

[54] BLOW MOLDED ONE-PIECE BOTTLE

[75] Inventors: Dale H. Behm, Ann Arbor, Mich.; George A. Plummer, Graham, Wash.

[73] Assignee: Hoover Universal, Inc., Ann Arbor, Mich.

[21] Appl. No.: 299,751

[22] Filed: Jan. 23, 1989

Related U.S. Application Data

[63] Continuation-in-part of Ser. No. 209,084, Jun. 17, 1988.

[51] Int. Cl.⁴ .............................................. B65D 1/02
[52] U.S. Cl. ...................................... 215/1 C; 220/70
[58] Field of Search .......................... 220/70; 215/1 C; 428/35.7

[56] References Cited

U.S. PATENT DOCUMENTS

| | | | |
|---|---|---|---|
| 3,043,461 | 7/1962 | Glassco | 220/70 X |
| 3,403,804 | 10/1968 | Colombo | 215/1 C X |
| 3,598,270 | 8/1971 | Adomaitis et al. | 215/1 C |
| 3,727,783 | 4/1973 | Carmichael | 215/1 C |
| 3,759,410 | 9/1973 | Uhlig | 215/1 C |
| 3,811,588 | 5/1974 | Vermeergergen et al. | 215/1 C |
| 3,871,541 | 3/1975 | Adomaitis | 215/1 C |
| 3,881,621 | 5/1975 | Adomaitis | 215/1 C |
| 3,935,955 | 2/1976 | Das | 215/1 C |
| 4,249,667 | 2/1981 | Pocock et al. | 215/1 C |
| 4,254,882 | 3/1981 | Yoshino | 215/1 C |
| 4,261,948 | 4/1981 | Krishnakumar et al. | 215/1 C X |
| 4,294,366 | 10/1981 | Chang | 215/1 C |
| 4,318,489 | 3/1982 | Snyder et al. | 215/1 C |
| 4,335,821 | 6/1982 | Collette et al. | 220/70 X |
| 4,368,825 | 1/1983 | Motill | 215/1 C |
| 4,620,639 | 11/1986 | Yoshino | 215/1 C |

FOREIGN PATENT DOCUMENTS

| | | | |
|---|---|---|---|
| 225155 | 6/1987 | European Pat. Off. | 215/1 C |
| WO86/05462 | 9/1986 | PCT Int'l Appl. | 220/70 |

*Primary Examiner*—Sue A. Weaver
*Attorney, Agent, or Firm*—Harness, Dickey & Pierce

[57] ABSTRACT

A one-piece self supporting blow molded plastic container having a generally cylindrical side wall and a bottom wall which extends downwardly and inwardly from the side wall. A plurality of wall portions extend downwardly from the bottom wall forming hollow legs extending below the bottom wall having planar feet which are inclined upwardly and inwardly from the outer edges of the feet. When filled, the bottom wall deflects downwardly and the inclined feet are moved into substantially horizontal positions such that the feet define a substantially flat supporting surface engaging area for the container. In so doing, the diameter of the container engaging area is not reduced, thereby maintaining the same container stability when filled as when empty.

4 Claims, 8 Drawing Sheets

BLOW MOLDED ONE-PIECE BOTTLE

CROSS REFERENCE TO RELATED APPLICATION

This application is a continuation-in-part of application Ser. No. 209,084, filed June 17, 1988 entitled Blow Molded Bottle With Improved Support and Strength Characteristics.

BACKGROUND OF THE INVENTION

This invention relates generally to one piece plastic beverage bottles and more particularly to an improved bottle of this type which has flat horizontal surfaces of increased area that firmly support the bottle in an upright position when filled.

A major difficulty with the use of plastic bottles for carbonated beverages is the strength of the bottle base. Due to internal carbonation pressures which can exceed 75 psi, plastic bottles have a tendency to bulge outward at the base, resulting in what is referred to as a "rocker" which will rock back and forth when standing on a flat surface or possibly tip over. In addition, as the base bulges outward, the volume of the bottle increases, thereby lowering the fill line such that consumers may believe the bottle was not properly filled or sealed.

One solution to the problem of bulging is to provide a bottle having a hemispherical base portion and attach thereto a base cup having a flat lower surface for supporting the bottle in an upright position. This type of bottle is commonly referred to as a composite bottle. Composite bottles are widely used for carbonated beverage bottles of sixteen ounces or more. Increasing material cost for base cups has, however, encouraged the development of one piece bottles having a self-supporting base which is reinforced to prevent bulging due to carbonation pressures.

Several factors must be taken into consideration in the evaluation of a bottle base. Stability is one of the most important factors. A bottle must be stable when empty as well as full. An empty bottle must be stable enough to stand upright on bottle filling machinery. If bottles fall over while being conveyed, the efficiency of the filling operation will be adversely affected. To provide a stable bottle, the diameter of the bottle engaging area which contacts a supporting horizontal surface must be maximized. In addition, the area of the base that is in surface-to-surface contact with the supporting surface should be maximized.

Another evaluation factor is the strength of the base in resisting bursting upon impact when the bottle is filled. Stress cracking in the base will reduce the strength, resulting in a base which bursts easily. The amount of stress cracking is related to the base geometry. Relatively large radius curves in the base will reduce the stress cracking compared to a base with small radius curves.

Yet another evaluation factor to consider is the ability to properly vent the mold cavity when blow molding the bottle. Sufficient venting must be provided to ensure that the plastic material will be blown completely into each leg of the base to form feet at the lower ends of the legs which define the support surface engaging areas of the bottle.

Examples of one-piece containers are illustrated in the following patents: U.S. Pat. Nos. 3,598,270 entitled "Bottom End Structure for Plastic Containers"; 4,294,366 entitled "Free-Standing Plastic Bottle"; 4,318,489 entitled "Plastic Bottle"; 3,871,541 entitled "Bottom Structure for Plastic Containers"; 4,249,667 entitled "Plastic Container With a Generally Hemispherical Bottom Wall Having Hollow Legs Projecting Therefrom"; 4,261,948 entitled "Method of Increasing the Wall Thickness of a Bottom Structure of a Blown Plastic Material Container"; 4,254,882 entitled "Plastic Pressure Bottle; 4,301,933 entitled "Synthetic Resin Thin Walled Bottle"; 3,403,804 entitled "Blown Bottle of Flexible Plastics"; 3,727,783 entitled "Non-Everting Bottom for Thermoplastic Bottles"; 3,759,410 entitled "Pressure Resistant Plastic Container"; 3,811,588 entitled Bottle; 3,881,621 entitled "Plastic Container with Non-Everting Bottom"; 3,935,955 entitled "Container Bottom Structure"; 4,355,821 entitled "Blow Molded Plastic Material Bottle Bottom"; and 4,368,825 entitled "Self Standing Bottle Structure".

Each of these prior art bottles, however, has at least one disadvantage associated with its base structure. The base structure of a plastic bottle will deflect downwardly when the bottle is filled with a carbonated liquid. When this occurs in several of the bottles disclosed in the above patents, the diameters and sizes of the support surface engaging areas are decreased resulting in bottles of reduced stability when full.

Several of the bottles disclosed in the above patents also have base geometries with small feet and relatively small radius curves. This results in support instability and stress cracks which reduce the strength of the base causing the base to burst upon impact.

Most blow molded bottles are molded in mold cavities which are vented using pin hole vents at the lower end of the mold cavity. It has been found that pin hole vents are not large enough to provide sufficient venting to ensure that the plastic is moved completely into each of the bottle feet to consistently form the support surface engaging areas of the bottle.

With these short comings in the prior art in mind, it is an object of this invention to provide a bottle with flat support surface engaging areas of increased size and increased diameter relative to the bottle diameter to thereby improve stability of the filled bottle.

It is a further object of this invention to provide a bottle wherein deflection of the base due to filling does not decrease the support surface engaging area.

Accordingly it is a further object if the invention to provide a container with larger radius bends and curves to reduce the possibilities for stress cracking.

It is a further object of the invention to provide a method for making the bottle which enables the venting capacity of the mold to be effectively increased to enable the bottles to be consistently blow molded with the plastic drawn completely into the foot cavities at the lower end of the base.

SUMMARY OF THE INVENTION

The present invention provides a plastic container for carbonated beverages which has a base structure extending downward from a generally tubular side wall. The base structure includes an arcuate bottom wall extending from the lower end of the tubular side wall. The bottom wall terminates at its lower end in a center section which is centrally of the base structure. The bottom wall is interrupted at a plurality of locations radially outward of the center section by downwardly projecting wall portions which form hollow legs extending below the bottom wall. The legs terminate in flat feet which are inclined radially inwardly and upwardly. When the container is standing upright on a horizontal surface, the outer edges of the feet contact the horizontal surface and provide non-continuous support surface engaging areas for the container.

When the container is filled with a carbonated liquid, the pressure within the container forces the bottom to deflect downward. When this occurs, the feet are rotated generally about their outer edges to substantially horizontal positions in which they provide large surface-to-surface contact areas with the horizontal surface on which the container is supported. As a result, when the container is filled, the diameter of the support surface engaging areas of the container is not reduced as it is in many prior art containers when the containers are filled. When the container is filled, the outer edges of the feet remain in contact with the horizontal surface, providing support surface engaging areas having a diameter equal to that of an empty container.

The wall portions which extend downwardly from the base bottom wall taper slightly inwardly from the container tubular side wall. This taper is necessary to enable manufacture of the container. By minimizing this taper as much as possible, the radial distance from the container axis to the outer edges of the feet is maximized resulting in a relatively large diameter for the support surface engaging areas. This improves the stability of the container. In addition, a base with a larger diameter at its lower end enables the planar surface area of the feet to be increased over that shown in the prior art.

Furthermore, by increasing the diameter of the support surface engaging area, the radius of curves within the base can be increased to reduce stress cracking in the base.

Feet with relatively large area planar surfaces also enable the use of boundary vent slots as opposed to pin holes in the mold to increase the venting capacity and ensure proper molding of the base.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
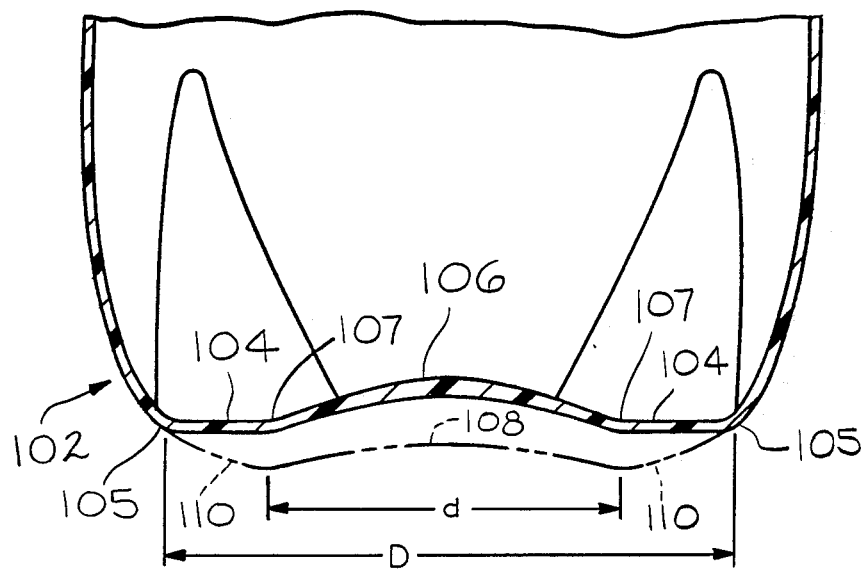
FIG. 1 is a sectional view of the base of a prior art container.
Figure 2:
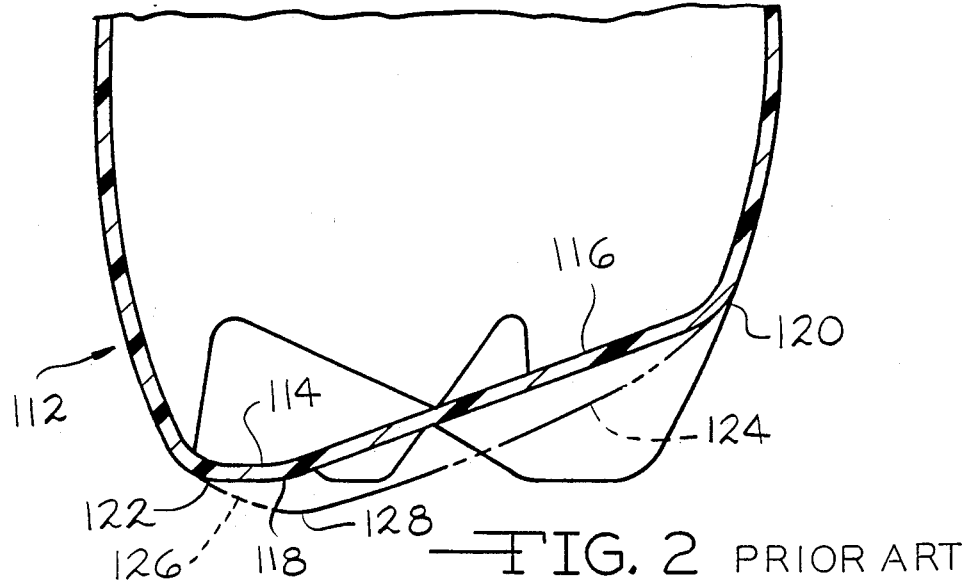
FIG. 2 is a sectional view of the base of another prior art container.

Prior art plastic container bases are shown in FIGS. 1 and 2. Base 102 of FIG. 1 has a plurality of horizontal feet 104. The outer edges of the feet 104, indicated at 105, define the outer edges of the container support surface engaging areas having a diameter D. A center portion 106 closes the base between the inner edges 107 of the feet 104. The center portion 106 projects inwardly into the container forming a wall with a concave outer surface. The base shown in FIG. 1 is similar to a base disclosed in U.S. Pat. No. 3,598,270 to Adomaitis et al.

When the container having the base 102 is filled with a carbonated liquid, the pressure in the container forces the base to deflect downward such that the center portion 106 moves to the position shown in phantom line at 108. This in turn causes a rotation of the feet 104 generally about their outer edges 105 into the phantom line position at 110. In this position, the container is now supported on support surface engaging areas having a diameter d corresponding to the inner edge of the feet 110. The diameter d is significantly smaller that the diameter D, thus the stability of the container has been reduced upon filling of the container.

A base from another prior art container, similar to a container disclosed in U.S. Pat. No. 4,254,882 to Yoshino, is shown in FIG. 2. The base 112 has a horizontal feet 114 and ribs 116 extending from the inner edges 118 of feet 114 transversely to the opposite side wall of the bottle and joining the side wall at 120. The support surface engaging areas of the base 112 have a diameter extending to the outer edges 122 of the feet 114 when the container is empty. However, when the container is filled with a carbonated beverage, the pressure in the container deflects the base 112 downward such that the previously straight ribs 116 are now bowed downward as shown by phantom line 124. This results in a rotation of the feet 114 generally about their outer edges 122 into the position shown in the phantom line at 126. In this position, the diameter of the support surface engaging areas of the base now extends only to the inner edges 128 of the feet 126 in the deflected position, thus reducing the stability of the filled container from that of the empty container.

Figure 3:
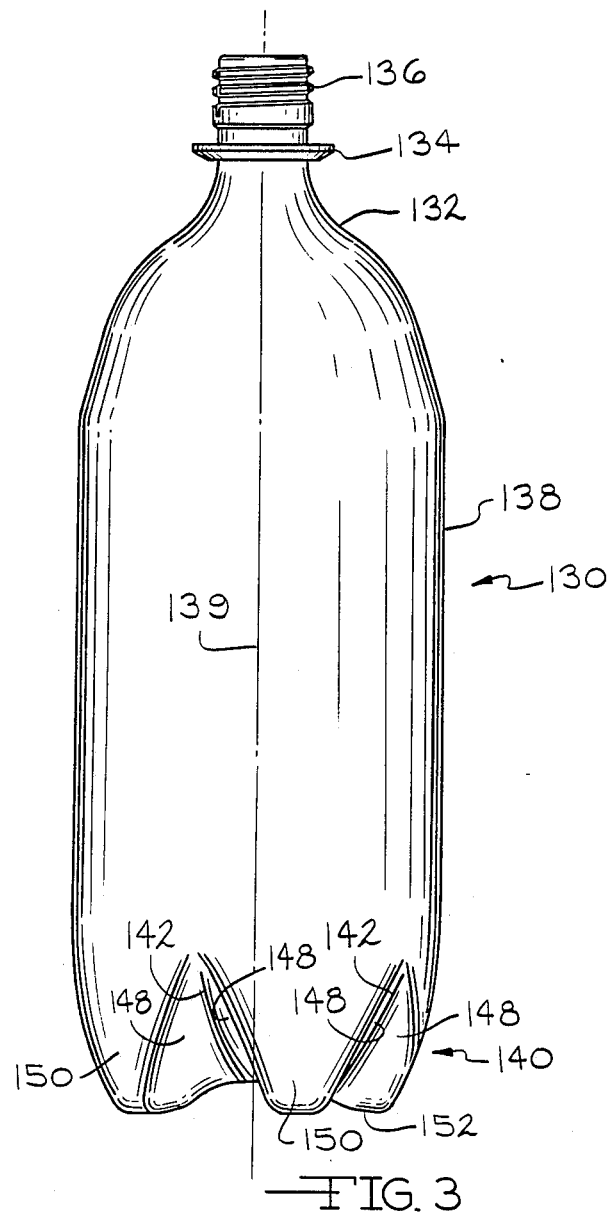
FIG. 3 is a side elevational view of a container of the present invention.

The plastic container of this invention includes a base in which, when the container is filled, the diametker of the support surface engaging areas is not reduced. A plastic beverage container, indicated generally at 130, having a base structure of this invention is shown in FIG. 3. The container is blow molded from a biaxially oriented saturated polyester, preferably polyethylene terephatalate (PET) and includes an integral tapered top portion 132 which includes a flange 134 and threaded neck 136. Extending downward from the tapered top portion 132 is a hollow body having a tubular side wall 138. The side wall 138 is generally cylindrical having an upright longitudinal axis 139 through the center thereof. A base 140 extends downwardly from the lower end of the side wall 138 and closes the bottom of the container 130.

Figure 5:
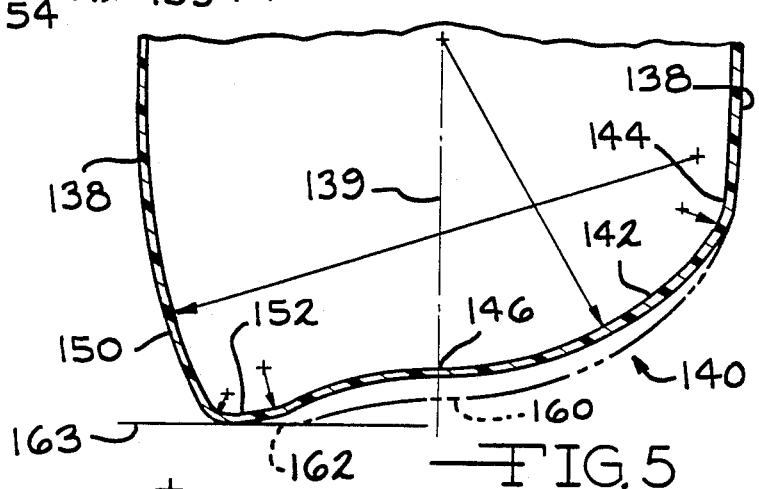
FIG. 5 is a sectional view as seen from substantially the line 5—5 of FIG. 4.

The base 140 has a downwardly extending bottom wall 142, best viewed in cross section in FIG. 5. Bottom wall 142 is curved radially inwardly from the lower end of the tubular side wall 138. As shown in FIG. 5, the bottom wall 142 is of a constant radius curve having a radius greater than the radius of the tubular side wall 138. A relatively small radius fillet section 144, is used to merge the upper end of the bottom wall 142 to the lower end of the side wall 138. The bottom wall 142 terminates at the lower end in a center section 146 which is substantially centrally of the base 140 and intersects the axis 139.

Figure 4:
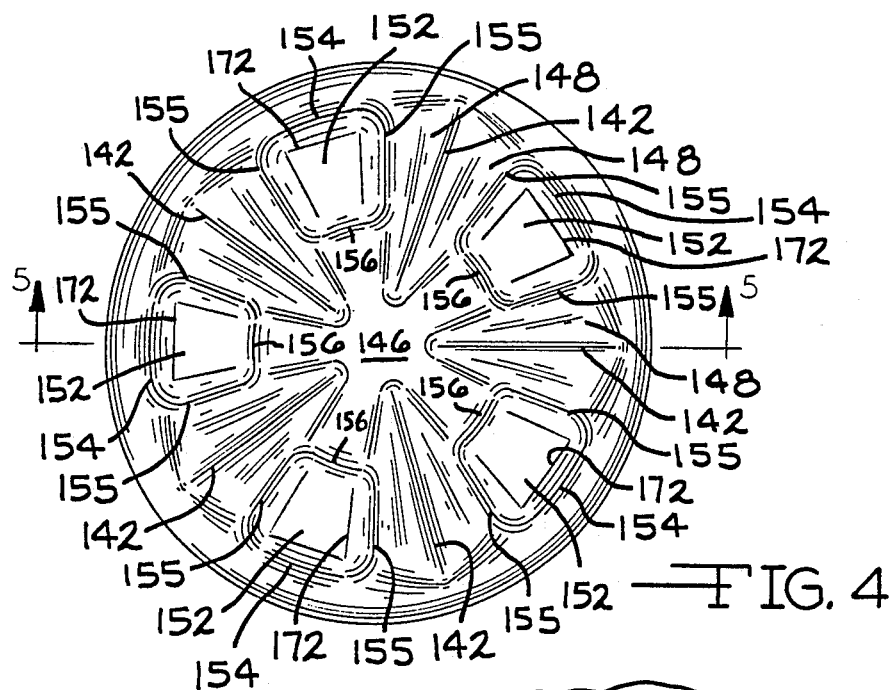
FIG. 4 is a bottom view of the container of FIG. 3.
Figure 5A:
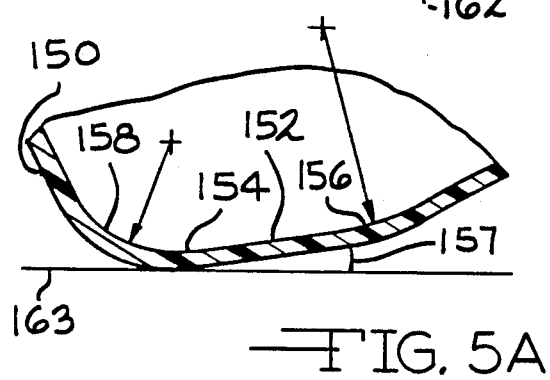
FIG. 5A is an enlarged view of a portion of FIG. 5.
Figure 6:
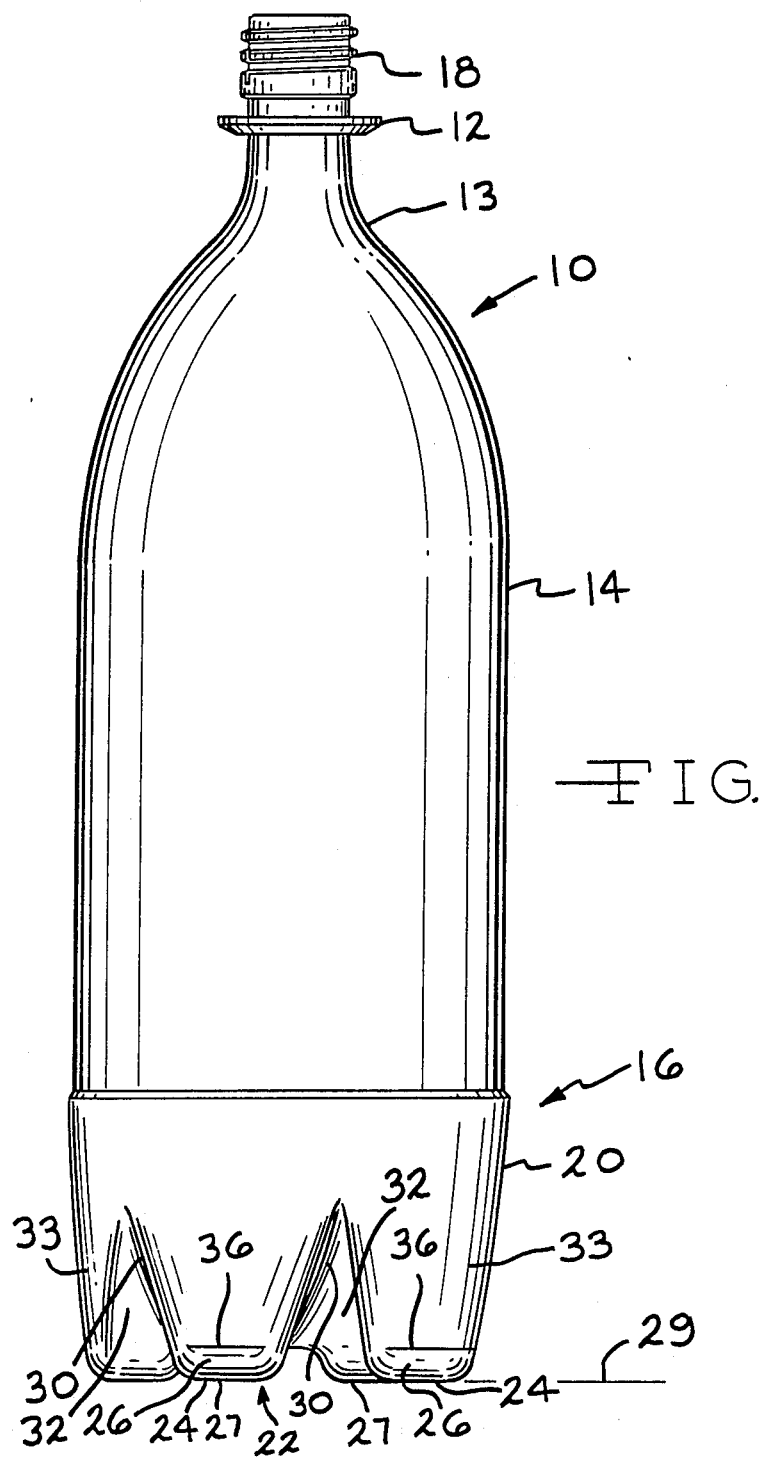
FIG. 6 is a side elevational view of a modified form of the container of this invention.
Figure 7:
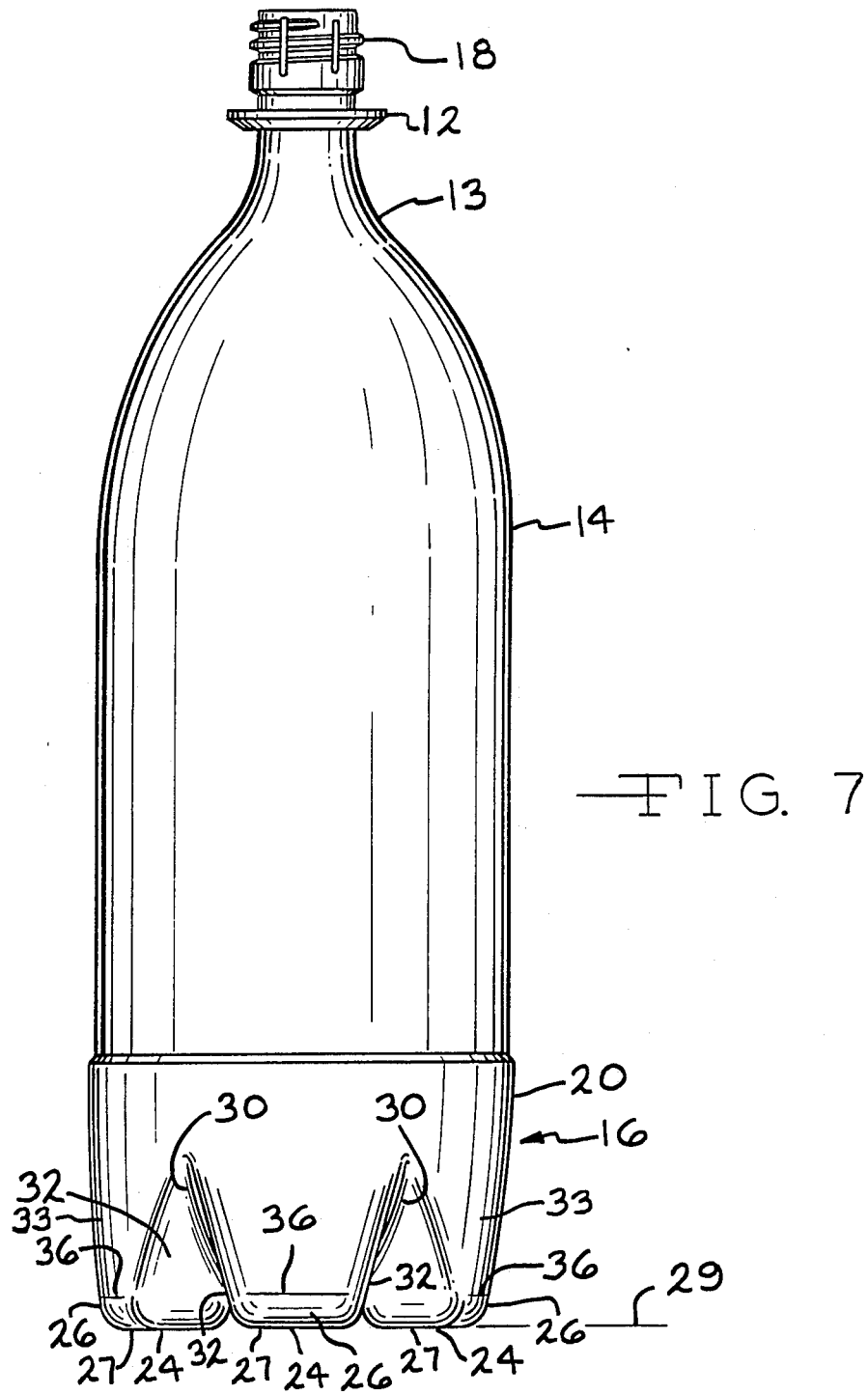
FIG. 7 is a side elevational view of the container of FIG. 6 showing a different view of the base structure of the container from that shown in FIG. 6.
Figure 8:
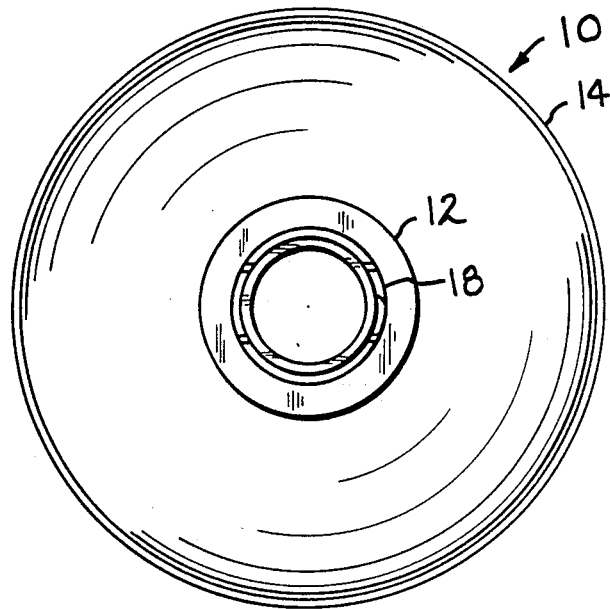
FIG. 8 is a top plan view of the container of FIGS. 6 and 7.
Figure 9:
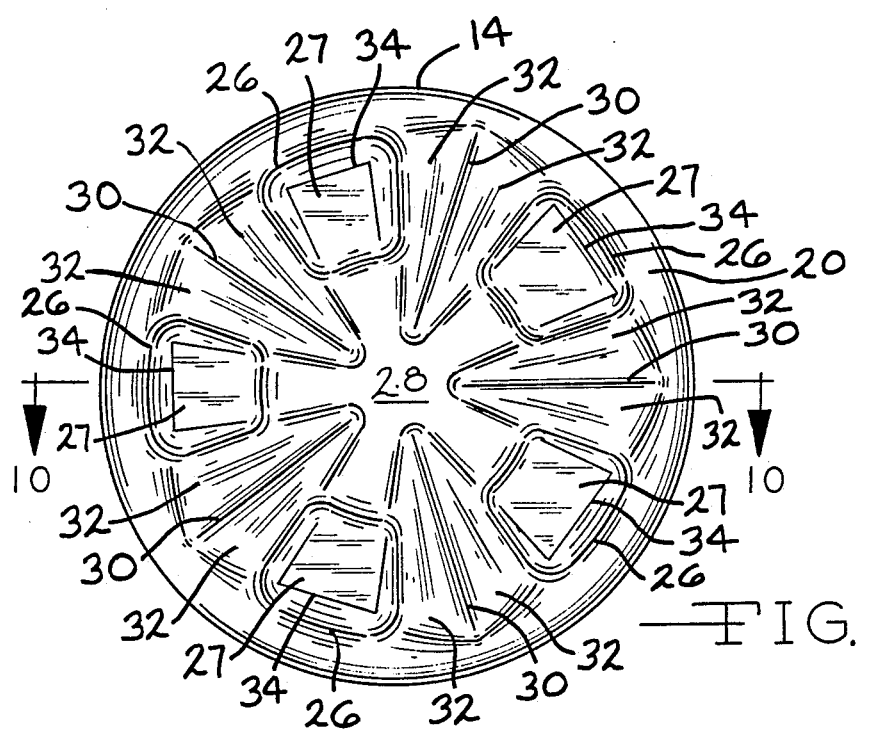
FIG. 9 is a bottom view of the container of FIGS. 6 and 7.

The bottom wall is interrupted by a plurality of downwardly projecting wall portions defining hollow legs radially spaced from the center section 146 and extending below the bottom wall 142. These wall portions include leg side wall portions 148 and leg outer wall portions 150 as illustrated in FIG. 3. Leg outer wall portions 150 form radially outer surfaces of the hollow legs. As shown, in FIGS. 3 and 5, the leg outer wall portions 150 are of a constant radius curve curving radially inwardly in a downward direction. Leg side wall portions 148 extend downwardly from the bottom wall and radially inwardly from the leg outer wall portions. The legs terminate in feet 152. FIG. 5A is an enlarged view of the foot portion of FIG. 10. Each foot 152 is planar and generally trapezoidal in shape (FIG. 4) having an outer edge 154 which is generally parallel with inner edge 156. The side edges 155 of feet 152 taper toward one another, radially inwardly.

Each foot 152 defines a planar surface which is inclined radially inwardly and upwardly such that the outer edge 154 of each foot is lower than the inner edge 156 of each foot. The outer edges 154 of the feet are adjacent the lower edges of the outer leg wall portions 150 and are merged thereto by a relatively small radius fillet section 158. The outer edges 154 of the feet 152 form support surface engaging areas for the container 130.

When the container 130 is filled with a carbonated beverage, the pressure within the container forces the center section 146 to deflect downward to the position indicated in FIG. 5 in broken lines 160. As a result of this downward motion of the center section 146, the feet 152 also move downward, rotating generally about the outer edges 154 to a horizontal position shown at 162. In this rotated position, the feet are now in surface-to-surface contact with the horizontal surface 163 upon which the container is supported. The outer edge of the engaging surfaces remains at 154 such that diameter of the support surface engaging areas is not reduced as a result of the deflection of the of the center section 146. Thus the stability of the bottle is not reduced when the bottle is filled.

The angle 157 which the feet 152 are inclined from the horizontal support surface 163 depends upon the size of the container and the material wall thickness of the base. These two factors will determine the amount of deflection of the base caused by internal pressure. It has been found that an angle of approximately 9° is sufficient for most two liter and sixteen ounce containers.

In addition to maintaining the stability of the base when the base is deflected, the surface area contact of the feet 162 with the surface 163 reduces wobbling of the container. An upright container, when bumped, will tend to wobble back and forth if it is not bumped hard enough to tip over. This wobble will eventually dampen out and the container will come to rest. When the feet 162 are in surface-to-surface contact with a support surface, the dampening of wobble is greater than when the bottle is empty and supported along the outer edges 154 of inclined feet 152.

Another embodiment of this invention is illustrated with the blow molded plastic container designated generally at 10 in FIGS. 6–10. The container 10 includes an integral tapered top portion 13 having a flange 12 and a threaded neck 18. The container 10 also has a hollow tubular side wall 14 and an integral base 16.

Figure 10:
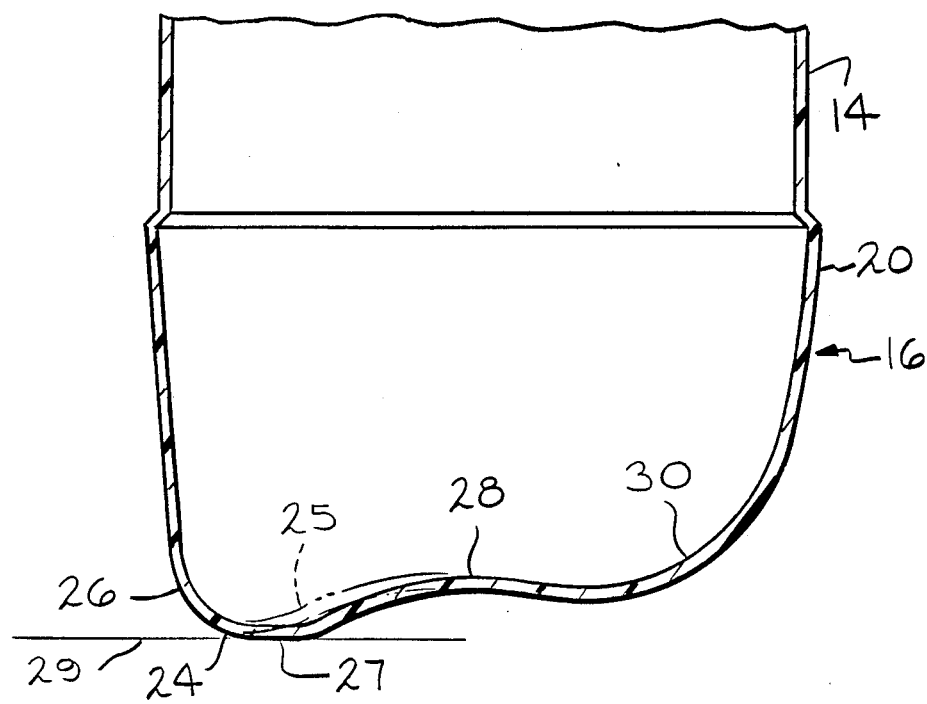
FIG. 10 is a sectional view as seen from substantially the line 10—10 in FIG. 9.

The base 16, as shown in FIG. 10, includes a bottom wall extending downwardly from the side wall 14 having an upper portion 20 and a lower portion 30 which is arcuate radially inwardly in a downward direction. The bottom wall terminates in a center section 28 substantially centrally of the base 16.

The bottom wall is interrupted by a plurality of downwardly projecting wall portions defining hollow legs 26 extending below the bottom wall. These wall portions include leg side wall portions 32 and leg outer wal portions 33. Leg outer wall portions 33 form radially outer surfaces of the hollow legs 26. As shown in FIG. 10, leg outer wall portions 33 uniformly taper radially inwardly in a downward direction. The legs terminate in planar feet 25 (FIG. 10) which merge with the center section 28. Feet 25 are inclined radially inwardly and upwardly as shown in the broken lines indicating the position of the feet when the container is empty. The solid lines, shown the feet at 27, illustrate the position of the feet when the container is filled with a carbonated beverage. When the container is filled, the feet 25 rotate generally about their outer edges 24 to the position shown at 27 in which the feet are in surface-to-surface contact with a horizontal surface 29.

In both embodiments of the invention, having the feet spaced radially outwardly as much as possible enables the feet to have relatively large planar surfaces to form support surface engaging areas. In addition, this spacing allows the radii of the curved portions in the base to be larger than many prior art containers thus reducing the possibilities for stress cracking in the base. It has been found for both two liter and sixteen ounce containers that five feet is optimal to provide larger feet and larger radii curved portions in the base.

Figure 11:
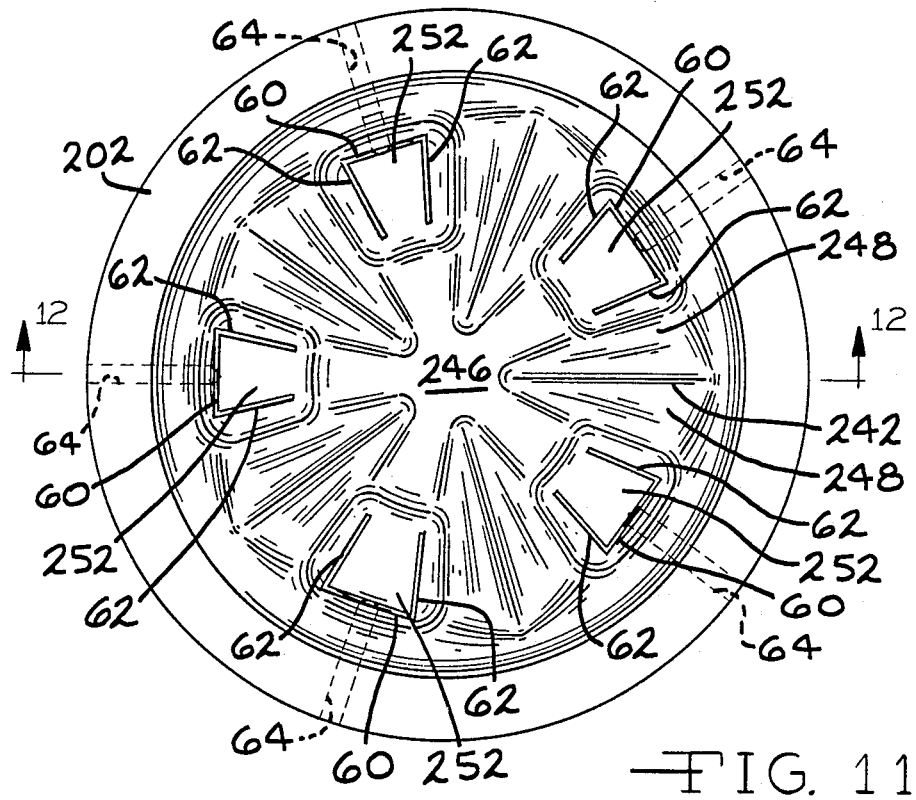
FIG. 11 is a top plan view of the base portion of a mold for production of the container shown in FIGS. 3–5.
Figure 12:
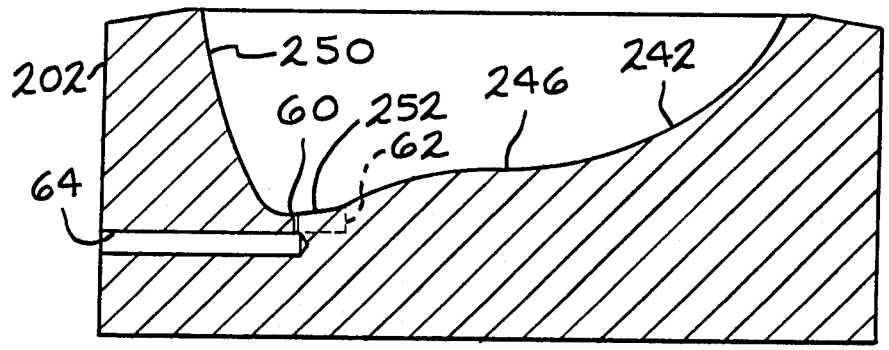
FIG. 12 is a sectional view of the mold of FIG. 11 as seen from substantially the line 12—12 of FIG. 11.

FIGS. 11 and 12 show the base 202 of the mold used to blow mold the bottle of this invention. The elements of the mold have been numbered using similar numbers used to refer to the bottle shown in FIGS. 3 through 5 only using 200 series numerals as opposed to 100 series numerals.

To provide sufficient venting of the mold to ensure that the plastic parison is completely blown into the legs and feet of the base, slot vent openings are machined into the planar surface areas of the feet portion of the mold at 252. These vent openings are narrow slots 60 machined along the radially outer edges of the feet 252 of the mold and slots 62 machined along the side edges of the feet and connected with the slots 60.

FIG. 12 is a sectional view of the base portion of the mold showing the vent slot 60 adjacent the outer edge of the foot 252 and the side vent slot 62 shown in broken lines. A passage 64 is machined through the side of the mold so that a suitable vacuum source can be connected to the vent slots 60 and 62 for removing air from the mold cavity. the base configuration, having relatively large feet 152, provides a suitable surface area for the vent slots 60 and 62. The slots are of a narrow width such that the plastic will not flow into the vent slots. The slots 60 and 62 are machined into the mold by an electrical discharge machining process. These slots form small protrusions on the outer surface of the container shown as lines 34 in FIG. 9 and lines 172 in FIG. 4 which are adjacent the outer and side edges of the feet. If desired, additional vent slots can be machined in the outer wall of the mold above the feet and result in small protrusions shown as lines 36 in FIGS. 6 and 7.

The containers 10 and 130 are blow molded from an injection molded plastic preform in a conventional manner. The preform is heated to the temperature at which it can be blow molded and then placed into a mold cavity having an interior surface of the desired configuration of the container. Pressurized air is introduced into the preform to expand the preform outwardly into contact with the mold cavity interior surface. The air within the cavity is exhausted through the slotted vent openings in the lower end of the mold cavity to enable the plastic to be completely blown into the feet portions of the mold cavity base portion.

The hollow legs are formed by blowing the plastic material of the bottom wall downward from the bottom wall. The legs terminate in substantially flat support surface engaging areas which are ballooned out of the bottom wall. The inclined engaging areas rotate by internal pressure in the container to form coplanar areas for engagement with a horizontal surface for supporting the container thereon.

The invention provides a one-piece blow molded plastic container which has a self supporting base. The base has a bottom wall extending from the lower end of the side wall of the container. A plurality of legs extend downward from the bottom wall forming hollow legs with planar feet that are inclined upwardly and inwardly from the outer edges of the legs. When filled with a carbonated beverage, the internal pressure in the horizontal position defining co-planar support surface engaging areas for supporting the container. This deflection does not result in a decrease in the diameter of the container support surface engaging areas, thereby not decreasing the stability of the container when filled. In addition, the container base is formed with relatively large radius curved portions to reduce the amount of stress cracking in the base, thereby incresing the strength of the base and reducing the possibility of bursting. Furthermore, the planar surfaces of the feet provide ample area for addition of venting slots in the mold cavity to ensure adequate venting of the mold to improve the consistency with which containers are molded.

It is to be understood that the invention is not limited to the exact construction or method illustrated and described above, but that various changes and modifications may be made without departing from the spirit and scope of the invention as defined in the following claims.

What is claimed is:

1. A carbonated beverage container comprising an upright hollow body of blow molded plastic material having an upright longitudinal axis, said body having a tubular side wall of a first diameter, said side wall merging at its lower end with a base structure, said base structure comprising.
    an arcuate bottom wall extending downwardly and radially inwardly from the lower end of said side wall and terminating at the lower end thereof in a center section which intersects said axis;
    said bottom wall being interrupted at locations radially outward of said center section by a plurality of downwardly projecting wall portions defining hollow legs terminating in substantially planar feet having inner and outer edges radially spaced from said center section, said feet being inclined in a direction radially inwardly and upwardly such that during support of said container on a horizontal support surface said outer edges of said feet are in contact with said horizontal surface, said feet being substantially equally spaced from said center section such that said outer edges of said feet form a non-continuous support surface engaging area of a predetermined outer diameter, said predetermined outer diameter being only slightly less than said first diameter, and said inner edges are above said surface thereby enabling said feet to rotate downwardly about said outer edges to substantially horizontal positions in which said feet from substantially said inner edges to said outer edges are in surface to surface engagement with said horizontal support surface in response to the internal pressure of a carbonated beverage within said cointainer with the outer diameter ofthe non-continuous support surface engaging area remaining substantially constant; and
    said wall portions including outer leg wall portions extending downwardly from said side wall forming a radially outer surface of said hollow legs, said outer leg wall portions having lower ends adjacent the outer edges of said feet.

2. The plastic container of claim 1 wherein said outer leg wall portions are connected to the outer edges of said feet by curved wall sections.

3. The container of claim 1 wherein said outer leg wall portions include uniformly tapered portions tapering radially inwardly as said outer leg wall portions extends downwardly from said side wall.

4. The container of claim 1 wherein said outer leg wall portions comprise substantially constant radius arcuate wall portions curved radially inwardly in a direction downwardly from said side wall.

* * * * *

UNITED STATES PATENT AND TRADEMARK OFFICE
CERTIFICATE OF CORRECTION

PATENT NO. : 4,865,206

DATED : September 12, 1989

INVENTOR(S) : Dale H. Behm and George A. Plummer

It is certified that error appears in the above-identified patent and that said Letters Patent is hereby corrected as shown below:

Column 4, line 31, delete "a".

Column 4, line 50, "diamether" should be --diameter--.

Column 6, line 27, "shown" should be --showing--.

Column 6, line 63, "the" should be--The--.

Column 7, line 34, after "in the" insert --container forces the bottom of the base downward, rotating the feet into a--.

Column 8, line 35, "ofthe" should be --of the--.

Column 8, line 49, "extends" should be --extend--.

Signed and Sealed this

Second Day of April, 1991

Attest:

HARRY F. MANBECK, JR.

Attesting Officer

Commissioner of Patents and Trademarks